| United States Patent [19] | [11] | 4,246,128 |
|---|---|---|
| Gallagher et al. | [45] | Jan. 20, 1981 |

[54] METHOD OF MAKING MNZN FERRITES

[75] Inventors: Patrick K. Gallagher, Basking Ridge; Ernst M. Gyorgy, Madison; David W. Johnson, Jr., Pluckemin; Murray Robbins, Berkeley Heights, all of N.J.

[73] Assignee: Bell Telephone Laboratories, Incorporated, Murray Hill, N.J.

[21] Appl. No.: 64,734

[22] Filed: Aug. 8, 1979

[51] Int. Cl.$^3$ .............................................. C04B 35/38
[52] U.S. Cl. ............................... 252/62.57; 252/62.59; 252/62.62
[58] Field of Search ................ 252/62.57, 62.62, 62.59

[56] References Cited

U.S. PATENT DOCUMENTS

| 2,565,861 | 8/1951 | Leverenz | 252/62.57 |
| 3,415,751 | 12/1968 | Hirota et al. | 252/62.59 |
| 3,843,541 | 10/1974 | Chiba et al. | 252/62.62 X |

FOREIGN PATENT DOCUMENTS 2721463  11/1978  Fed. Rep. of Germany ........ 252/62.62

OTHER PUBLICATIONS

Petri. et al., "Amer. Ceramic Soc. Conf.," pp. 2–5, 1977.
Hirota, "Japanese J. of Appl. Phys.," 5, pp. 1125–1131, 1966.

*Primary Examiner*—Jack Cooper
*Attorney, Agent, or Firm*—Richard D. Laumann

[57] ABSTRACT

Desirable properties of manganese zinc ferrites are obtained without the need for controlling or changing the oxygen partial pressure during the sintering and cooling steps by adding a small amount of germanium or gallium to the ferrite and using an atmosphere, such as air, during the sintering and cooling steps, that has at least 1 percent oxygen by volume.

6 Claims, 2 Drawing Figures

METHOD OF MAKING MNZN FERRITES

TECHNICAL FIELD

This invention is concerned with manganese zinc (MnZn) ferrites having a low temperature coefficient of permeability.

BACKGROUND OF THE INVENTION

Ferrites which have the structure of the mineral spinel and the nominal atom composition $MFe_2O_4$, where M is at least one divalent metal ion, are of considerable commercial interest. Of special interest for many uses, for example, filters and transformer cores, are manganese zinc (MnZn) ferrites because they can be manufactured with small low frequency losses, high permeability and low temperature and time dependence of desired properties, such as permeability. For MnZn ferrites, M is often $Fe_yMn_xZn_{1-x-y}$, x and y both greater than 0 and less than 1. The presence of the divalent iron ions gives the MnZn ferrite the desired magnetic properties such as permeability and temperature coefficient of permeability. This formula represents the composition of the basic manganese zinc ferrite but because of a desire to obtain additional specific desired properties, other cations, such as titanium, calcium or silicon, are frequently added and the nominal composition of M will vary accordingly from the values cited.

The production of ferrites with specified properties and compositions has proven to be a difficult task and much effort has been directed toward developing simpler methods of ferrite fabrication. A commonly used method for ferrite fabrication involves high temperature solid-state reactions between the oxides or carbonates of the ferrite cations. The process begins with thorough mixing of very fine particles of, for example, oxides or carbonates of the cations. The remainder of the process involves calcining, milling, granulating, pressing and sintering the mixture. The last step proceeds at a relatively high temperature, typically between 1100 degrees C. and 1400 degrees C., after which the ferrite is cooled to the ambient temperature.

Those people concerned with MnZn ferrites have long realized that fabrication of MnZn ferrites with the desired magnetic properties, such as low temperature dependence of permeability, has required careful regulation of the oxygen partial pressure in the atmosphere during both the sintering and cooling steps. Control of the oxygen partial pressure during the latter step has been found to be especially crucial if the desired magnetic properties are to be obtained. Control has generally required not only monitoring and regulating the oxygen partial pressure of the atmosphere, but also varying the oxygen partial pressure as the temperature changes.

Regulation of the oxygen partial pressure in the atmosphere during cooling has been found necessary both to regulate the amount of $Fe^{2+}$ in the ferrite and to prevent the precipitation of hexagonal phases containing $Fe^{3+}$ and $Mn^{3+}$. The effects on the ferrite of not regulating the oxygen partial pressure during sintering and cooling include the undesirable properties of a greatly reduced permeability and a greatly increased negative temperature coefficient of permeability. The latter property is especially deleterious as it makes the design of devices that must operate over an extended temperature range difficult.

SUMMARY OF THE INVENTION

We have found that manganese zinc ferrites may be fabricated with a relative temperature coefficient of permeability less than 0.02 percent within the temperature range between $-40$ degrees C. and 80 degrees C. by adding small amounts of either Ge or Ga to the ferrites. The ferrites may be fabricated without changing the oxygen partial pressure during either the sintering or cooling steps by having the sintering and cooling steps take place in an atmosphere that has at least 1 percent, by volume, oxygen. The ferrites have the atom composition $Mn_aZn_bA_xFe_{2+d}O_4$, where A is selected from the group consisting of germanium and gallium, the sum of a and b is both greater than or equal to 0.65 and less than or equal to 0.99; x is greater than or equal to approximately 0.01 and less than or equal to approximately 0.15, and d is greater than 0.0 and less than or equal to 0.2. It is to be understood that the ferrite may deviate from the stoichiometric formula given by, for example, an oxygen excess of up to 0.4, and that the formula recited is intended to include such deviations. The ferrites are fabricated by forming a mixture of the desired ferrite composition and sintering the mixture at a temperature between approximately 1150 degrees C. and 1300 degrees C. in a first atmosphere and then cooling the mixture in a second atmosphere when both atmospheres comprise at least 1 percent oxygen by volume. The oxygen partial pressure does not have to be changed as the temperature changes during either step. In a preferred embodiment, A is germanium and sintering and cooling take place in atmospheres, such as air, having approximately 20 percent oxygen.

DETAILED DESCRIPTION

Figure 1:
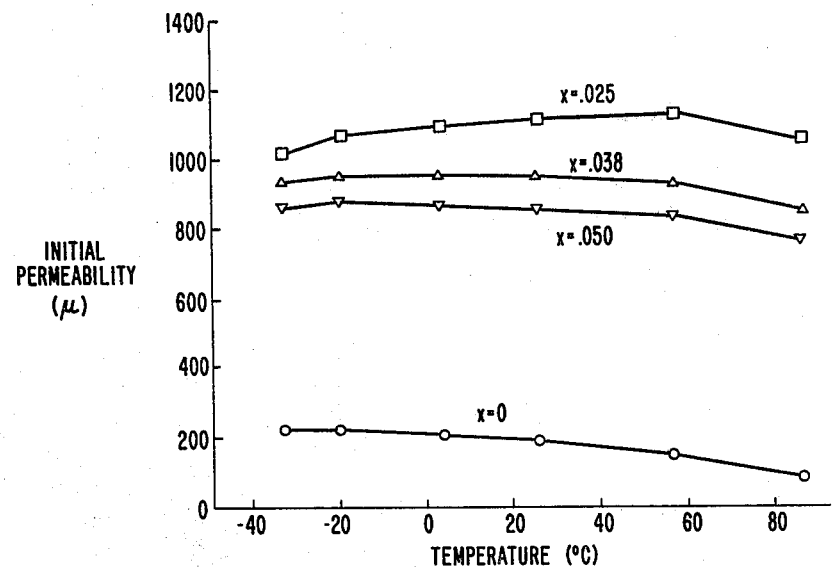
FIG. 1 shows the initial permeability, plotted vertically, versus temperature in degrees Centigrade, plotted horizontally, for several MnZn ferrite compositions having different amounts of germanium.

MnZn ferrite compositions having relative temperature coefficients of permeability less than 0.2 percent over the temperature range from $-40$ degrees C. to 80 degrees C. are obtained by adding small amounts of Ge or Ga to the basic MnZn ferrite composition. The ferrites of this invention have the atom composition represented by the formula $Mn_aZn_bA_xFe_{2+d}O_4$. In the formula, A is selected from the group consisting of gallium and germanium; the sum of a and b is both greater than or equal to 0.65 and less than or equal to 0.99; x is greater than or equal to 0.01 and less than or equal to 0.15; d is greater than 0.0 and less than or equal to 0.2. Actual ferrite compositions may deviate from the nominal composition by, for example, oxygen excesses of up to 0.4. The stated formula defines relationships between a, b and c. If x is less than 0.01, the desired ferrite properties, permeability and relative temperature coefficient of permeability, cannot be obtained without controlling the oxygen partial pressure during sintering and cooling and if x is greater than 0.15, not all of the A atoms will go into solution. If d is 0.0, it is difficult to obtain a low temperature coefficient and if d is greater than 0.2, it is difficult to obtain a relatively high permeability. In a preferred embodiment, A is germanium and sintering and cooling are done in air. It is to be understood that the actual compositions may deviate from the nominal formula by the inclusion of small amounts of other cations. It is also to be understood that the divalent and trivalent iron ions are grouped together in the formula.

The MnZn ferrite compositions, with a low temperature coefficient of permeability, are fabricated by conventional techniques, after addition of Ge or Ga, that form a mixture of the desired ferrite composition prior to the sintering and cooling steps. A suitable method will be outlined only briefly as the details of the method will be readily apparent to those skilled in the art. Particles containing the components of the ferrite composition, for example, oxides or carbonates of the cations present in the ferrite, are prepared in desired amounts and thoroughly mixed by conventional and well-known techniques such as ball milling. After mixing, the composition is calcined, milled, granulated and pressed.

The sintering step which follows next takes place in an atmosphere having an oxygen content greater than 1 percent by volume. It is not necessary to change the oxygen partial pressure during the sintering step. Temperatures between 1150 and 1300 degrees C. may be used for the ferrites containing germanium and temperatures between approximately 1180 and 1250 degrees C. have been found best for the ferrites containing gallium. Although the precise oxygen content has been found to be noncritical, it has been found expedient to use air as the atmosphere.

After sintering for a period of approximately 1 to 4 hours, the ferrite is cooled to the ambient temperature in an atmosphere that has an oxygen content greater than 1 percent by volume. As for the sintering step, it has been found expedient to use air as the atmosphere during the cooling step. The precise cooling rate is not crucial and any rate that is consistent with the maintenance of ferrite structural integrity may be used. It is not necessary to change the oxygen partial pressure during the cooling process.

FIG. 1 plots, for MnZn ferrites fabricated as described above, initial permeability vertically versus the temperature in degrees Centigrade horizontally for ferrite compositions in which a equals 0.515, b equals 0.435 minus the values indicated on the Figure, x equals the values indicated on the Figure, d equals 0.05 and A is germanium. The samples were sintered at a temperature of 1200 degrees C. for one hour in air and then cooled in air. As can be seen, the addition of small amounts of germanium greatly increases the initial permeability over that obtained when no germanium is added to the ferrite. The initial permeability values are comparable to those that are obtained in MnZn ferrites only by monitoring and controlling the oxygen partial pressure as the temperature varies during the sintering and cooling steps.

Figure 2:
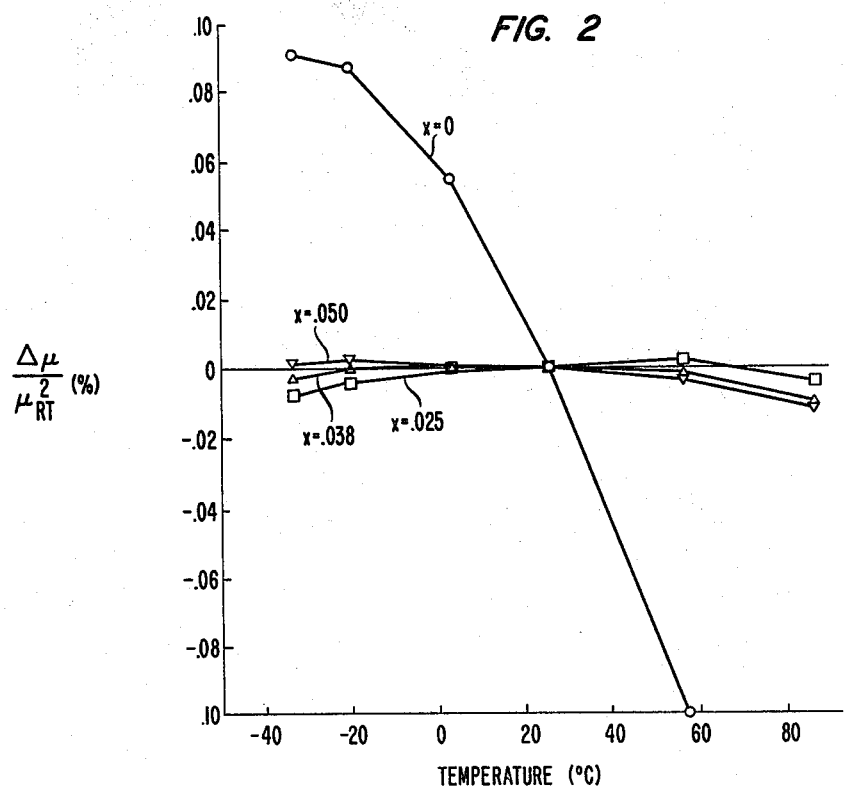
FIG. 2 shows the relative temperature coefficient of permeability in percent, plotted vertically, versus the temperature in degrees C., plotted horizontally, for several MnZn ferrite compositions having different amounts of germanium.

FIG. 2 plots, for MnZn ferrites fabricated as described above, the relative temperature coefficient of permeability in percent vertically versus the temperature in degrees Centigrade horizontally for the same ferrite compositions as were plotted in FIG. 1. The relative temperature coefficient of permeability is defined as the percent change in permeability, between the indicated and room temperatures, taken as 22 degrees C., divided by the room temperature permeability squared and multiplied by 100. The relative temperature coefficient of permeability has the property that when it is multiplied by the effective permeability of a core with an air gap, it gives the calculated temperature coefficient of permeability for that core. The MnZn composition having no germanium has a large temperature coefficient of permeability while the MnZn compositions containing germanium have temperature coefficients of permeability that are less than 0.02 percent and comparable to or better than those attained in manganese zinc ferrites by monitoring and controlling the oxygen partial pressure as the temperature varies during the sintering and cooling steps.

As can be seen from the Figures, for values of d approximately equal to 0.05, the initial permeability and the temperature coefficient of permeability are relatively insensitive to the precise amount of germanium in the ferrite if x is between 0.025 and 0.05. This insensitivity to the precise amount of germanium extends over the range for d from 0.03 to 0.1.

The precise mechanism by which the desirable attributes of the method of this invention are obtained is hypothesized to be the following. It is believed that substitution of ions such as $Ge^{4+}$ and $Ga^{3+}$ for some of the divalent species, especially Zn, stabilizes and controls the amount of $Fe^{2+}$ present in the ferrite and eliminates the need to monitor and vary the oxygen partial pressure during the sintering and cooling steps.

EXAMPLE 1

200 grams of a ferrite having the composition $Mn_{0.515}Zn_{0.410}Ge_{0.025}Fe_{2.05}O_4$ were prepared. 187.74 gm $Fe_2O_3$, 73.86 gm $MnCO_3$, 38.81 gm ZnO and 3.051 gm $GeO_2$ were mixed with deionized water in a high speed mixer for 15 minutes. The water was filtered from the slurry and the residue was dried for approximately 12 hours at 110 degrees C. Calcining was 900 degrees C. for 16 hours in $O_2$ using fused silica boats and was followed by ball milling for 16 hours using $CCl_4$, with 10 percent, based on total ferrite weight, of a binder. The slurry was dried while stirring and granulated through a 20-mesh sieve. The composition was pressed at 50,000 psi and the binder removed by slowly heating at 100 degrees C. per hour until a temperature of 600 degrees C. was reached. Sintering was at 1300 degrees C. for 6 hours in air and was followed by cooling in air. The temperature was raised to 1300 degrees C. at 400 degrees per hour, and cooling was the same rate until the furnace could not be cooled at this rate without additional cooling means.

EXAMPLE 2

A ferrite having the composition $Mn_{0.515}Zn_{0.397}Ge_{0.038}Fe_{2.05}O_4$ prepared using 187.63 gm $Fe_2O_3$, 73.82 gm $MnCO_3$, 37.56 gm ZnO and 4.635 gm $GeO_2$ and processing as in Example 1.

EXAMPLE 3

A ferrite having the composition $Mn_{0.515}Zn_{0.385}Ge_{0.050}Fe_{2.05}O_4$ was prepared using $Fe_2O_3$, 73.82 gm $MnCO_3$, 36.41 gm ZnO and 6.096 gm $GeO_2$ and processing as in Example 1.

We claim:

1. A method of producing a manganese zinc ferrite having a relative temperature coefficient of permeability less than 0.02 percent over the temperature range from −40 degrees C. to 80 degrees C., and the atom composition $Mn_aZn_bA_xFe_{2+d}O_r$; the sum of a and b is greater than or equal to 0.65 and less than or equal to 0.99; d is greater than 0.0 and less than or equal to 0.2; comprising:

forming a mixture of ferrite components corresponding to said atom composition;

sintering said mixture in a first atmostphere at a temperature between approximately 1150 degrees C. and 1300 degrees C.; said first atmosphere comprising at least 1 percent, by volume, oxygen; and cooling said mixture to ambient temperature in a second atmosphere CHARACTERIZED IN THAT: A is selected from the group consisting of germanium and gallium; x is greater than or equal to 0.01 and less than or equal to 0.15; said second atmosphere comprises at least 1 percent, by volume, oxygen.

2. A method as recited in claim 1 in which A is germanium.

3. A method as recited in claim 2 in which d is greater than 0.03 and less than 0.1.

4. A method as recited in claim 3 in which x is between 0.025 and 0.05.

5. A method as recited in claim 2 or 4 in which said temperature is approximately 1300 degrees C.

6. A method as recited in claim 2 or 4 in which said first and second atmospheres comprise approximately 20 percent oxygen.

* * * * *